(12) United States Patent
Luo (10) Patent No.: US 7,595,479 B2
(45) Date of Patent: Sep. 29, 2009

(54) TILT DETECTOR AND TILT DETECTING METHOD FOR THE SAME

(75) Inventor: Yin-Long Luo, Hang-Zhou (CN)

(73) Assignee: Asia Optical Co., Inc., Taichung (TW)

( * ) Notice: Subject to any disclaimer, the term of this patent is extended or adjusted under 35 U.S.C. 154(b) by 71 days.

(21) Appl. No.: 11/745,683

(22) Filed: May 8, 2007

(65) Prior Publication Data

US 2007/0261257 A1    Nov. 15, 2007

(30) Foreign Application Priority Data

May 11, 2006    (TW) .............................. 95116718 A (51) Int. Cl.
  *G06M 7/00*    (2006.01)
  *G01N 15/06*    (2006.01)
  *G01C 9/06*    (2006.01)
(52) U.S. Cl. ..................... 250/221; 250/577; 33/366.16
(58) Field of Classification Search ......... 250/573–577, 250/221, 222.1; 33/366.16, 348, 366.26, 33/377, 389
See application file for complete search history.

(56) References Cited

U.S. PATENT DOCUMENTS 3,813,556 A * 5/1974 Beer et al. ................... 250/575
4,154,000 A * 5/1979 Kramer .................... 33/366.14

* cited by examiner

*Primary Examiner*—Georgia Y Epps
*Assistant Examiner*—Don Williams
(74) *Attorney, Agent, or Firm*—Thomas, Kayden, Horstemeyer & Risley (57) ABSTRACT

A tilt detector and tilt detecting method for the same are disclosed. The tilt detector includes a light-detecting unit and a light-permeable unit. The light-detecting unit includes a body, a window formed on the body, and a signal port device formed on the body. The window detects the position of a moving facula, and the signal port device outputs the facula location signal. The light-permeable unit mounted in the window and includes a chamber, an opaque fluid filled with the chamber, and a light-permeable substance formed on the opaque fluid. The window detects a facula by the light-detecting unit when a beam is emitted to the window via the light-permeable substance. Therefore, the level of a subject is detected by observing the light-permeable substance directly, and obtains the precise level by the signal outputted from the signal port device.

20 Claims, 12 Drawing Sheets

TILT DETECTOR AND TILT DETECTING METHOD FOR THE SAME

RELATED APPLICATIONS

The application claims priority to Taiwan Application Serial Number 95116718, filed May 11, 2006, which is herein incorporated by reference.

BACKGROUND

1. Field of Invention

The present invention relates to a detector and detecting method, and more particularly to a tilt detector and tilt detecting method for the same.

2. Description of Related Art

Figure 1:
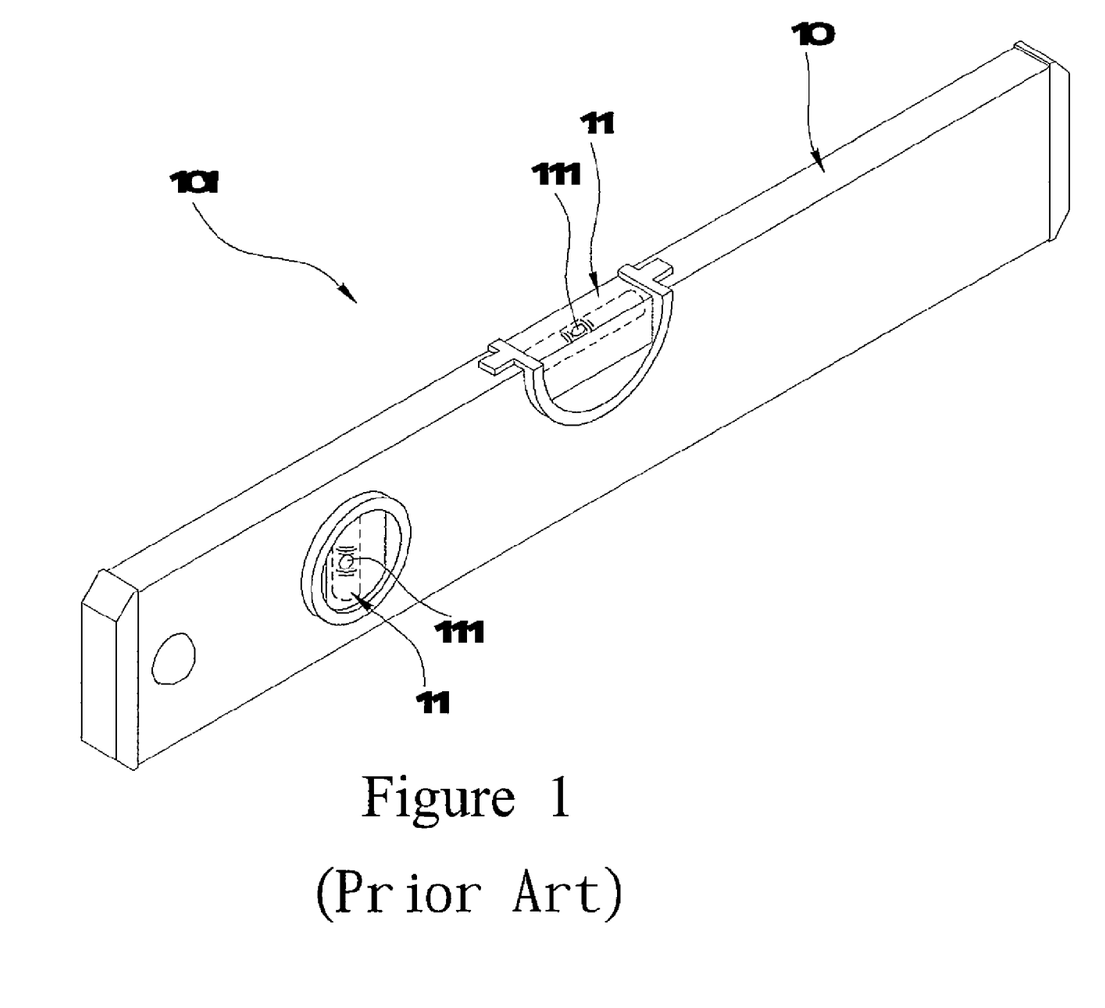
FIG. 1 is a perspective view of a conventional spirit level.

FIG. 1 is a perspective view of a conventional spirit level. The spirit level 101 is a general tool for measuring the level of a subject. The spirit level 101 includes a body 10, and a plurality of air bubble units 11, wherein each air bubble unit 11 possess a movable air bubble 111 adapted to the tilt of a plane. The spirit level 101 determines level of a subject by observing the location of the air bubble 111. If the spirit level 101 is set on a level subject, the air bubble 111 is located in the center of the air bubble units 11 of the spirit level 101. However, the measurement depends on naked-eye observation of an observer, and the human error frequently leads to inaccurate measurements. For example, the viewpoint may affect the precision of the observation. In addition, the observations of the location of the air bubble 111 is roughly that unable to measure the level precisely.

Figure 2:
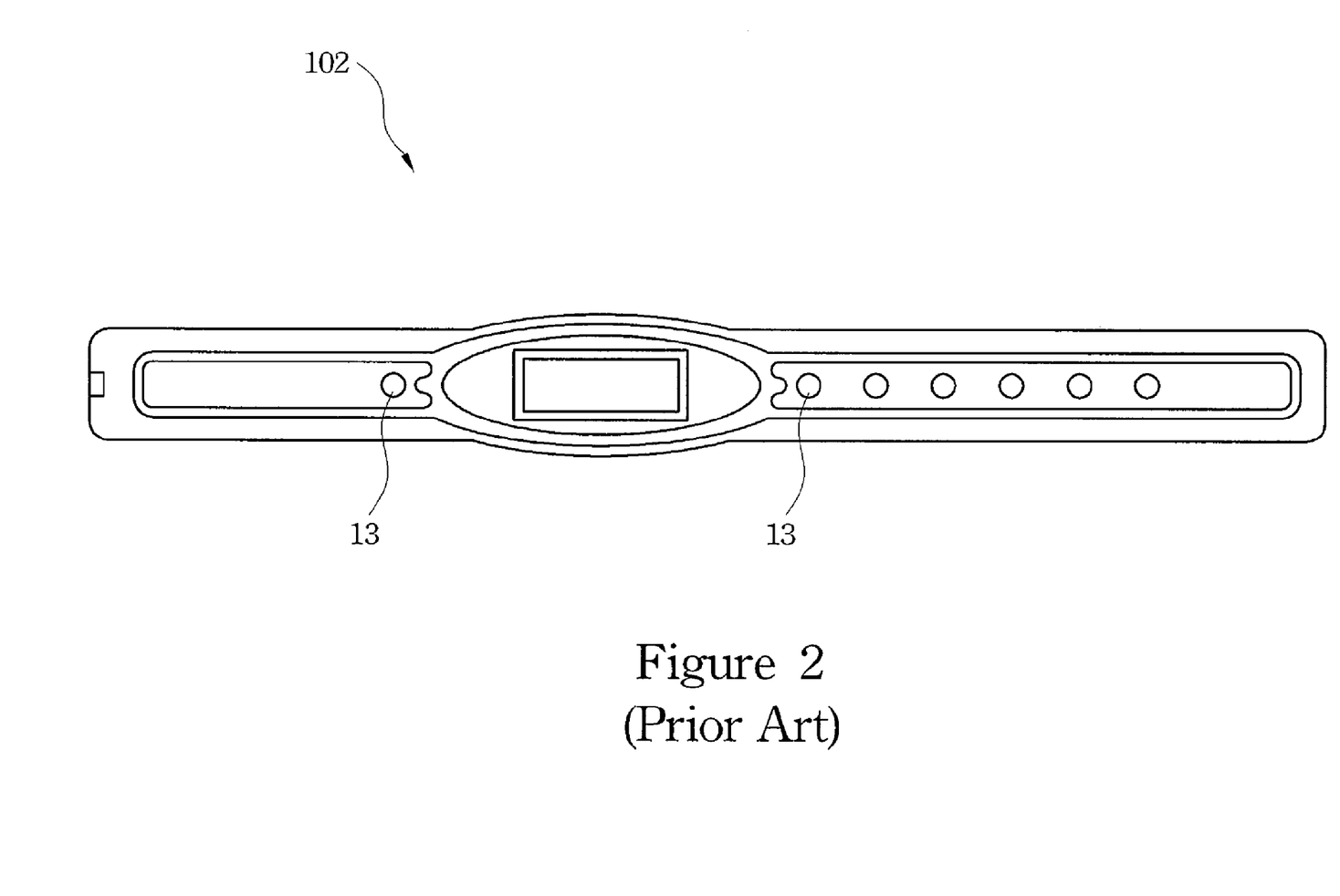
FIG. 2 is a diagram of an operating panel of a conventional electrical spirit level.

For the forgoing reasons, an electrical spirit level is used for measuring the level of a subject more accurately. Refer to FIG. 2. FIG. 2 is a perspective view of an electrical spirit level. The electrical spirit level 102 provides accuracy in the level determination, and includes pluralities of a functional bottom 13, such as an angle/slope bottom, a data-storing bottom, and a data-accessing bottom to conform to users' requirement. However, the electrical spirit level 102 is more expensive than the conventional spirit level 101, and the level cannot be determined with the naked eye directly. Therefore, the electrical spirit level 102 is more expansive and complex compared with the spirit level 101.

SUMMARY

The present invention provides a tilt detector with low cost and high accuracy, and the measured results can be observed through the naked eye.

It is another aspect of the present invention to provide a tilt detecting method with high accuracy and can be observed with the naked eye.

The tilt detector comprises a light-detecting unit and a light-permeable unit. The light-detecting unit includes a body, a window formed on the body along a first axis, and a signal port device formed on the body. The light-detecting unit detects a facula location moved along the first axis through the window, and the signal corresponding to the facula location is outputted by the signal port device.

The light-permeable unit mounted on the window and includes a chamber, an opaque fluid filled with the chamber, and a light-permeable substance positioned in the opaque fluid. The chamber includes a first sidewall and a second sidewall wherein the first sidewall is connected with the window and pervious to light, and the second sidewall is opposite to the first wall and also pervious to light. The light-permeable substance is contact with the first sidewall and the second sidewall of the chamber. The facula detected by the window is transmitted through the light-permeable substance.

The tilt detecting method with the above-mentioned tilt detector includes the following steps:

(A) setting the tilt detector on a subject;

(B) forming a facula on the window with a beam transmitted through the light-permeable substance; and (C) determining the facula location output through the signal port device of the light-detecting unit.

The level state of a subject can be observed directly through the light-permeable substance of the tilt detector. The signal port device of the light-detecting unit receives the signal of the facula location variation to determine the level state more precisely, so as to move the light-permeable substance to the center of the window to level the subject. The tilt detector includes a high accuracy advantage, and the measure result can be observed through the naked eye. Furthermore, the tilt detector is economical to use because the manufacturing of the light-detecting unit and light-permeable unit are developed techniques.

It is to be understood that both the foregoing general description and the following detailed description are by examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

DESCRIPTION OF THE PREFERRED EMBODIMENTS

Reference will now be made in detail to the present preferred embodiments of the invention, examples of which are illustrated in the accompanying drawings. Wherever possible, the same reference numbers are used in the drawings and the description to refer to the same or like parts.

Figure 3:
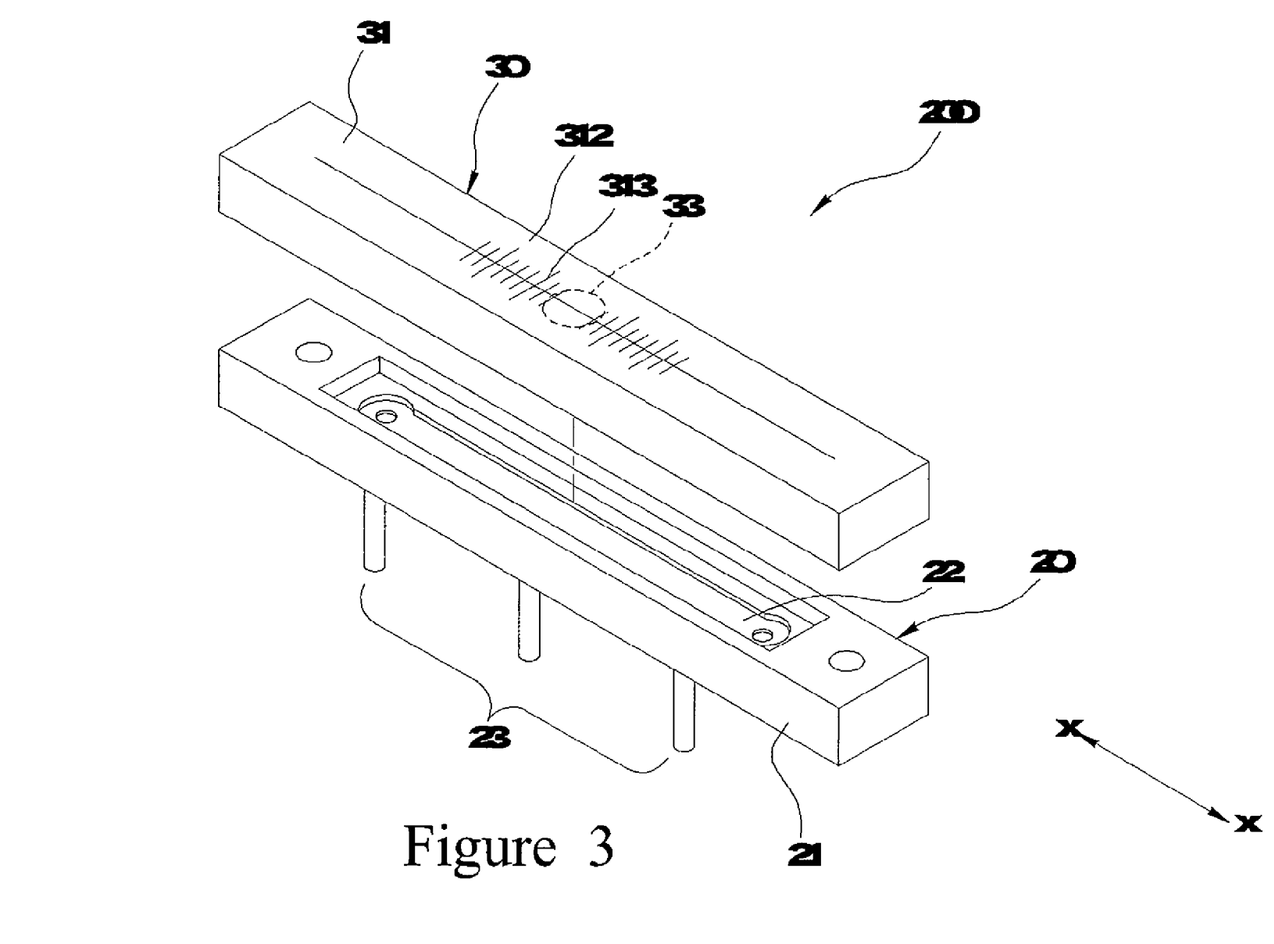
FIG. 3 is an exploded perspective view of a tilt detector of an embodiment of the present invention.
Figure 4:
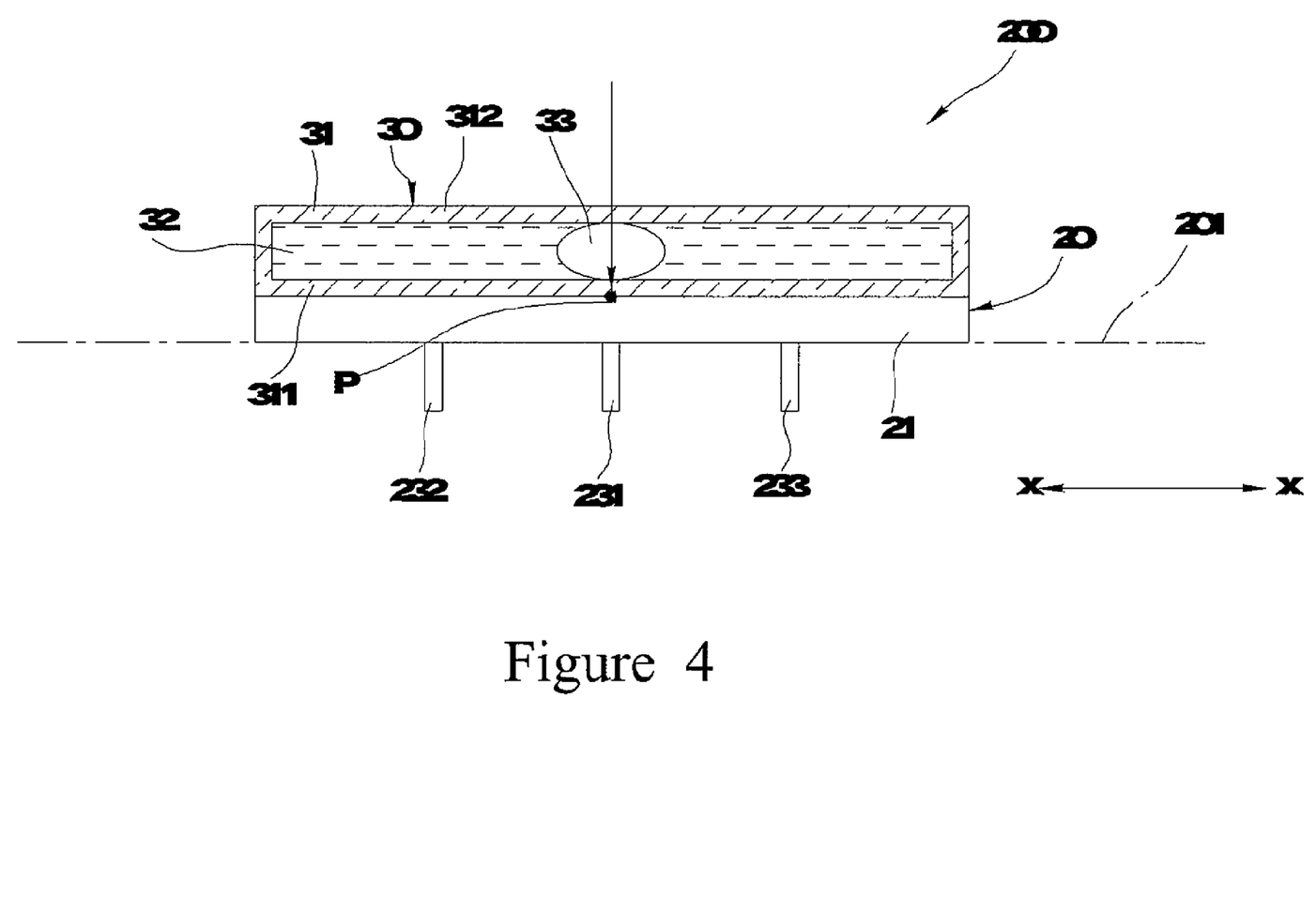
FIG. 4 is a sectional view of the tilt detector in FIG. 3.

Refer to FIG. 3 and FIG. 4. FIG. 3 is an exploded perspective view of the tilt detector in accordance with a first embodiment of the present invention, and FIG. 4 is a sectional view of the tilt detector in FIG. 3. A tilt detector 200 determines the level state of a plane 201. The tilt detector 200 includes a light-detecting unit, such as a position sensitive detector 20, and a light-permeable unit 30.

A position sensitive detector 20 includes a body 21, a window 22 formed on the body 21 along a first axis X, and a signal port device 23 formed on the body 21. The body 21 detects a facula P location moved along the first axis X through the window 22, and the signal port device 23 outputs the signal corresponding to the facula P location. The signal port device 23 comprises a first terminal 231, a second signal terminal 232 and a third signal terminal 233, wherein the first terminal 231 imports (to input) a working voltage; the second signal terminal 232 and the third signal terminal 233 output the different current in accordance with the various facula location.

The light-permeable unit 30 includes a chamber 31, an opaque fluid 32 filled with the chamber 31, and a light-permeable substance 33 in the opaque fluid 32.

The chamber 31 includes a first sidewall 311, a second sidewall 312 and a scale 313. The first sidewall 311 is connected with the window 22 and the second sidewall 312 is opposite to the first sidewall 311. The first sidewall 311 and the second sidewall 312 are both pervious to light.

The light-permeable substance 33 touches the first sidewall 311 and the second sidewall 312 in the chamber 31. The facula P detected by the window 22 is transmitted through the light-permeable substance 33 of the window 22. The light-permeable substance 33 stays in the middle of the scale 313 when the tilt detector 200 is set on a level subject.

The detection principle of the tilt detector 200 is now described in detail. A photodetector of the tilt detector 200, the position sensitive detector 20, produces varied current signals in accordance with different locations of facula P in the window 22. That is, the outputted signals of the position sensitive detector 20 depend on the locations of facula P in the window 22.

Figure 5:
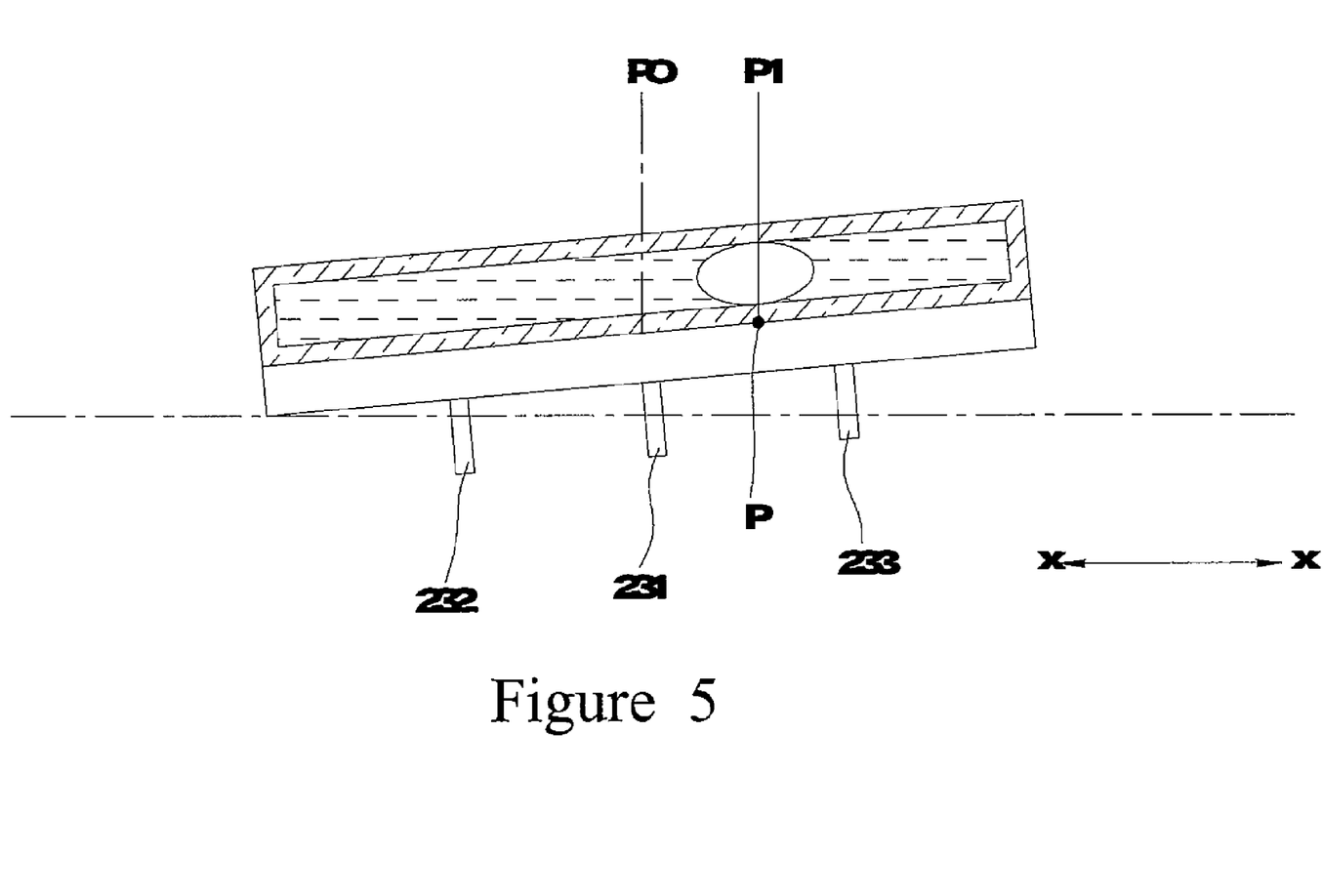
FIG. 5 is an operational sectional view of the tilt detector in FIG. 3.
Figure 6:
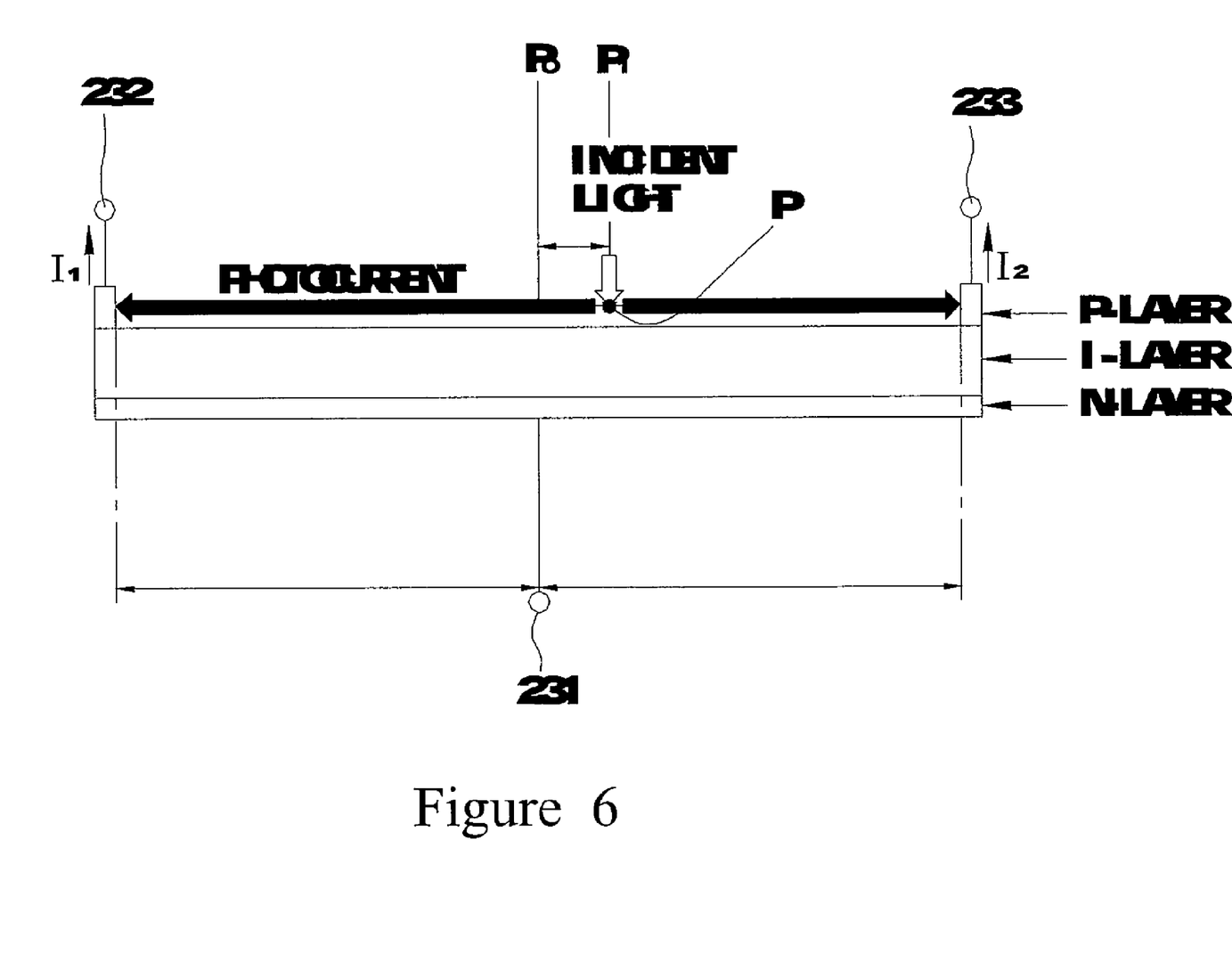
FIG. 6 is a diagram of the operating principle of a position sensitive detector of the tilt detector in FIG. 3.

Refer to FIG. 4, FIG. 5 and FIG. 6. FIG. 5 is an operational sectional view of the tilt detector in FIG. 3, and FIG. 6 is a diagram of the operating principle of a position sensitive detector of the tilt detector in FIG. 3.

The position sensitive detector 20 is a P-I-N photodetector. The first terminal 231 imports the working voltage when the position sensitive detector 20 is in use. An electric charge proportional to the incident energy is produced from the position of the facula P (incidence point) when a light beam is incident on the window 22. The electric charge produces two photoelectric currents, electric current $I_1$ and electric current $I_2$. A P-layer outputs the electric current $I_1$ to the second signal terminal 232, and the P-layer outputs the electric current $I_2$ to the third signal terminal 233. As a result of the integrated resistance value of the P-layer are is distributed equally, the lower resistance value and higher photoelectric current is generated when the facula P is near the second signal terminal 232 or the third signal terminal 233. That is, the value of electric current $I_1$ and electric current $I_2$ are inversely proportional to the distance extended from the facula P to the second signal terminal 232 and the third signal terminal 233.

Consequently, when the facula P is located within the center of the P-layer, the distances between the facula P and the two terminals (the second signal terminal 232 and the third signal terminal 233) are equal; so that the two terminals 232, 233 output identical resistance values, electric current $I_1$ and electric current $I_2$. Refer to FIG. 4, when the light-permeable substance 33 stays in the center of the chamber 31, which is filled with the opaque fluid 32, the light-permeable substance 33 determines the location of the facula P and the opaque fluid 32 blocks the remainder lights, so that the outputted electric current $I_1$ and electric current $I_2$ are equal and indicates that the tilt detector is set on a level subject precisely.

Refer to the FIG. 5 and FIG. 6. When the tilt detector 200 is set on an inclined subject, the light-permeable substance 33 moves along the slope of the subject, and the facula P is shifted from the center $P_0$ to an upper position $P_1$. Consequently, the electric current $I_1$ and the electric current $I_2$ are unequal and can determine that the tilt detector is on an inclined subject.

Therefore, the light-permeable substance 33 of the tilt detector 200 can be observed with the naked eye directly to satisfy the requirements of the users, and the level state can be determined with great precision by comparing the values of the electric current $I_1$ and electric current $I_2$. Furthermore, the tilt detector 200 possesses advantages of small size, low cost, easy to use and great precision so as to apply to various machines and tools that need precise level information.

Figure 7:
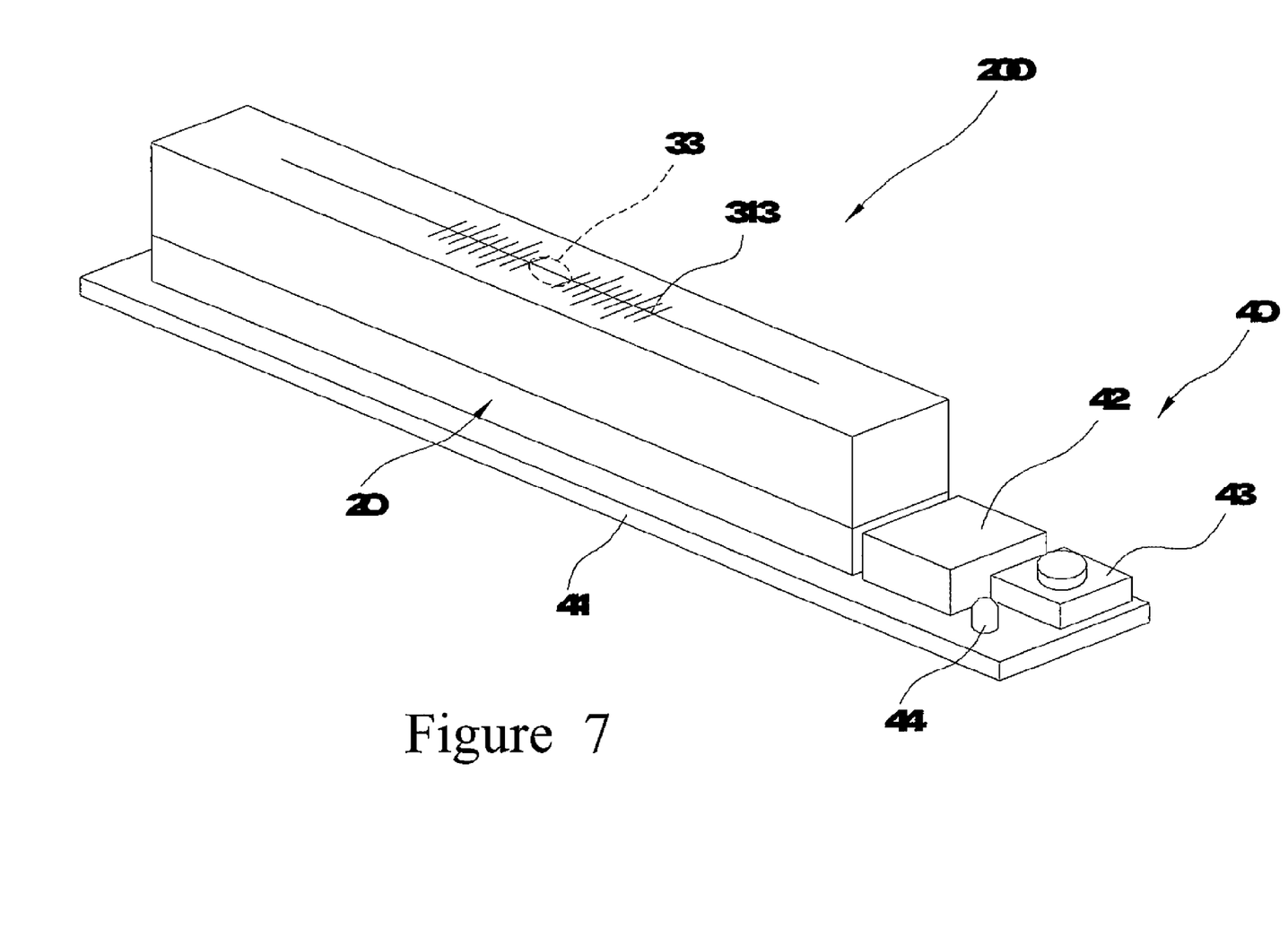
FIG. 7 is a perspective view of a tilt detector of another embodiment of present invention.
Figure 8:
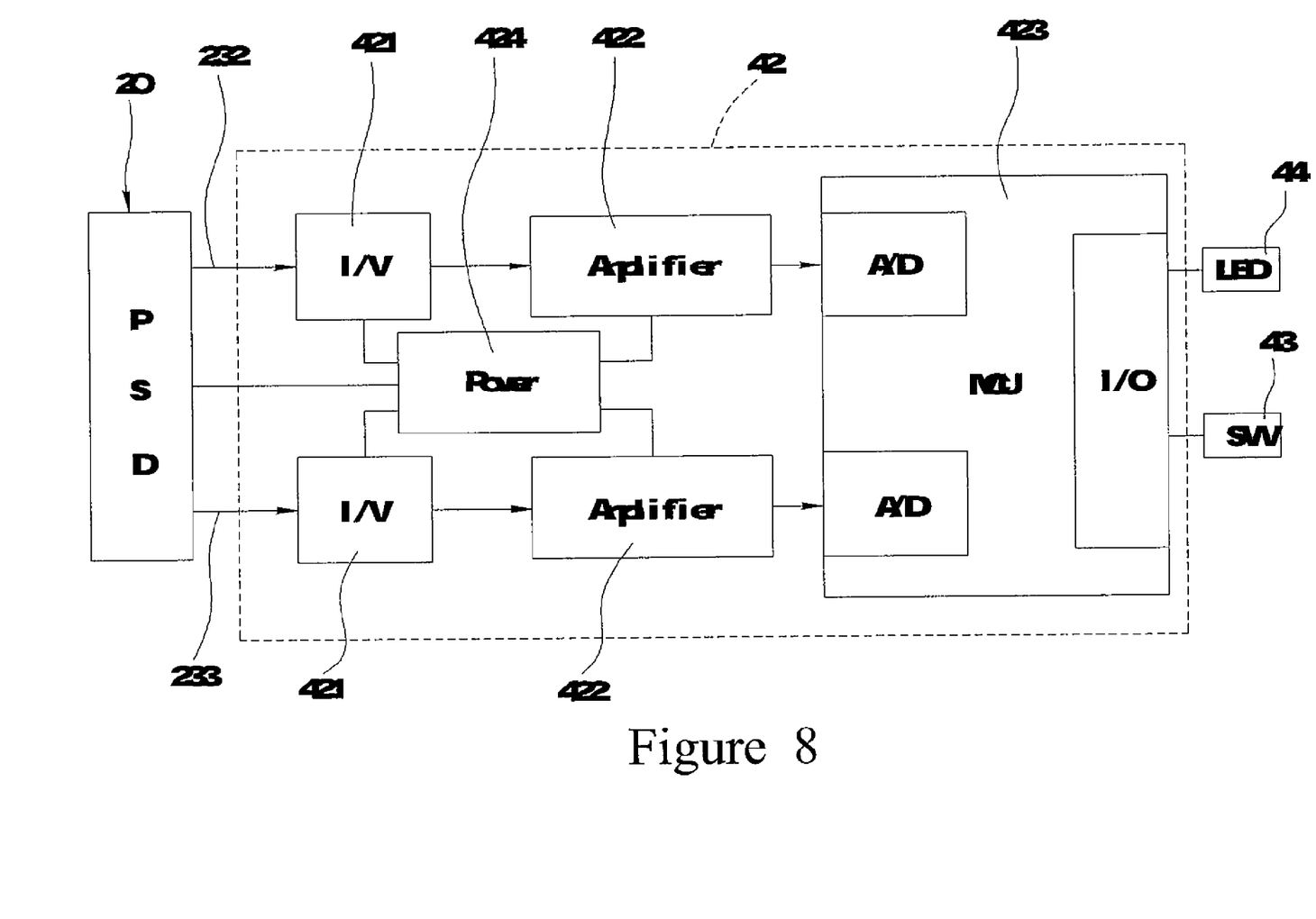
FIG. 8 is a block diagram of a control unit of the tilt detector in FIG. 7.

Refer to the FIG. 7 and FIG. 8. FIG. 7 is a perspective view of a tilt detector of another embodiment of present invention, and FIG. 8 is a block diagram of a control unit of the tilt detector in FIG. 7. A tilt detector is similar to the above-mentioned tilt detector 200, and further comprises a control unit 40. The control unit 40 outputs a level information signal so the user can determine the level state information directly.

The control unit 40 includes a substrate 41, a control module 42 set on the substrate 41 and electrically connected with the position sensitive detector 20, a control switch 43 set on the substrate 41 and electrically connected with the control module 42, and an outputting device 44 set on the substrate 41 and electrically connected with the control module 42.

The control module 42 possesses two current-to-voltage converter circuits 421 respectively electrically connected with the position sensitive detector 20, two amplifier circuits 422 respectively electrically connected with the current-to-voltage converter circuits 421, a control device 423 electrically connected with the amplifier circuits 422, and a battery-powered power circuit 424.

The current-to-voltage converter circuits 421 are respectively electrically connected with the second signal terminal 232 and the third signal terminal 233 of the position sensitive detector 20. The control device 423 provides an analog-to-digital function. The battery-powered power circuit 424 supplies power to above-mentioned components. The control switch 43 starts the control module 42. A light-emitting diode (LED) may be used as the outputting device 44.

The light-permeable substance 33 stays in the middle of the scale 313 to indicate that the tilt detector 200 is set on a level subject. As mentioned above, the second signal terminal 232 and the third signal terminal 233 output equal electric currents and convert the currents to voltage via the current-to-voltage converter circuits 421. The control device 423 generates the same digital data via an analog-to-digital conversion, and compares one digital data with another to ensure the two digital data are identical. If the two digital data are identical, a light is radiated from the device 44. According to the above-mentioned embodiment, users can obtain the level state of a subject by observing the light-permeable substance 33 located within the middle of the scale and sighting the light radiated from the outputting device 44.

In contrast, if the tilt detector is set on an inclined subject, the electric currents outputted from the second signal terminal 232 and the third signal terminal 233 are unequal and the outputting device 44 cannot be lighted. Therefore, the control unit 40 provides an easy way to determine the level state of a subject precisely.

Figure 9:
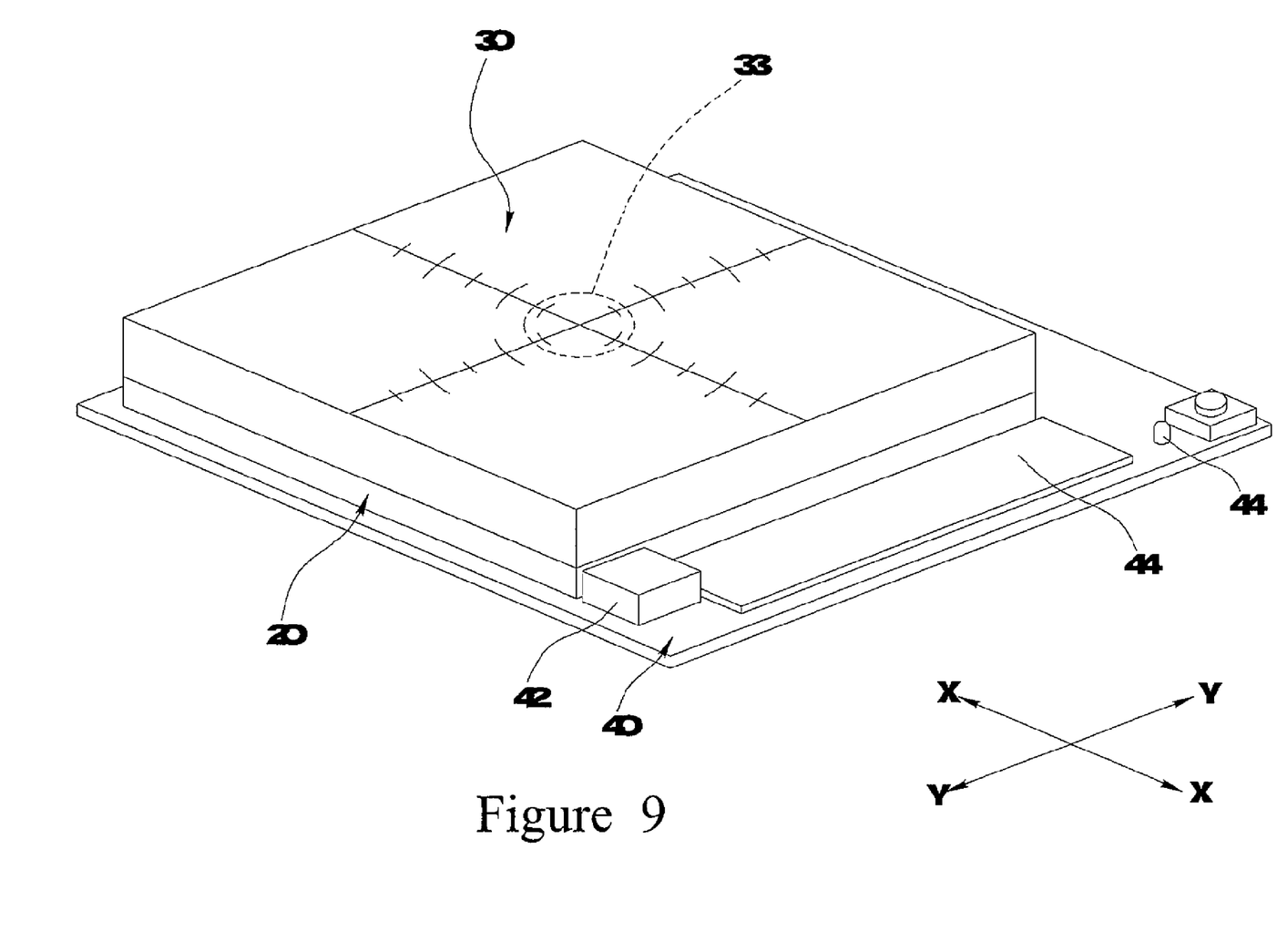
FIG. 9 is a perspective view of a tilt detector of another embodiment of the present invention.
Figure 10:
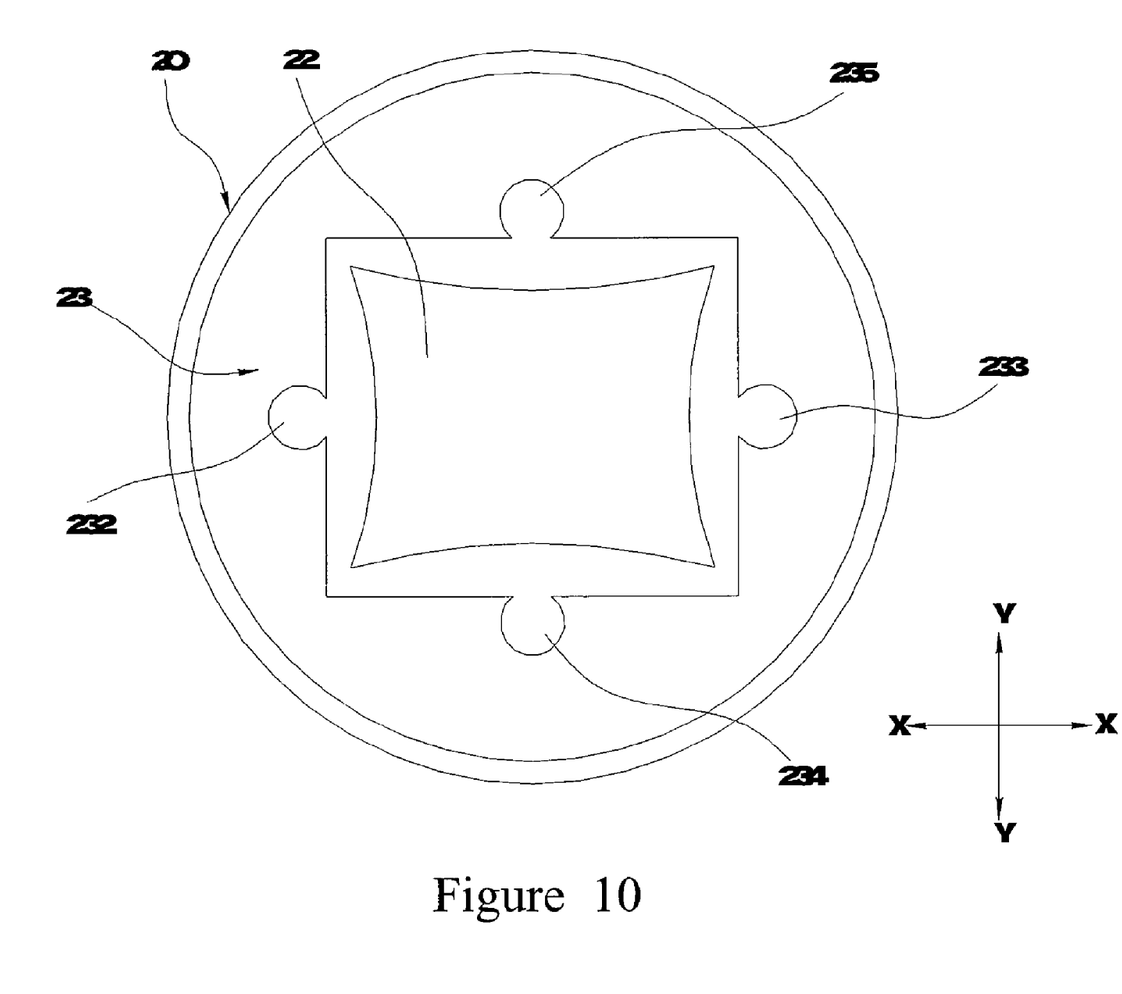
FIG. 10 is a vertical view of a position sensitive detector of the tilt detector in FIG. 9.
Figure 11:
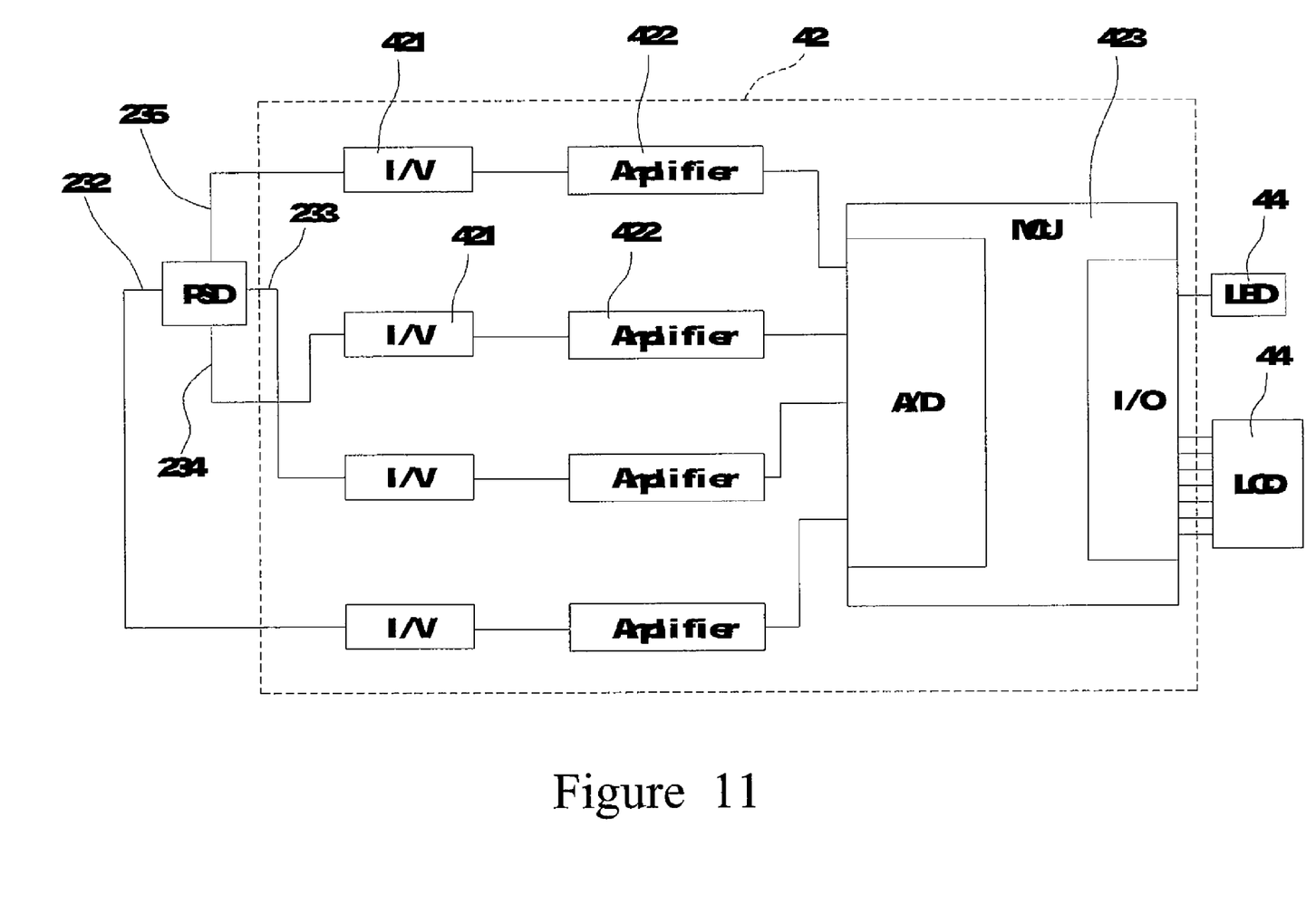
FIG. 11 is a block diagram of a control unit of the tilt detector in FIG. 9.
Figure 12:
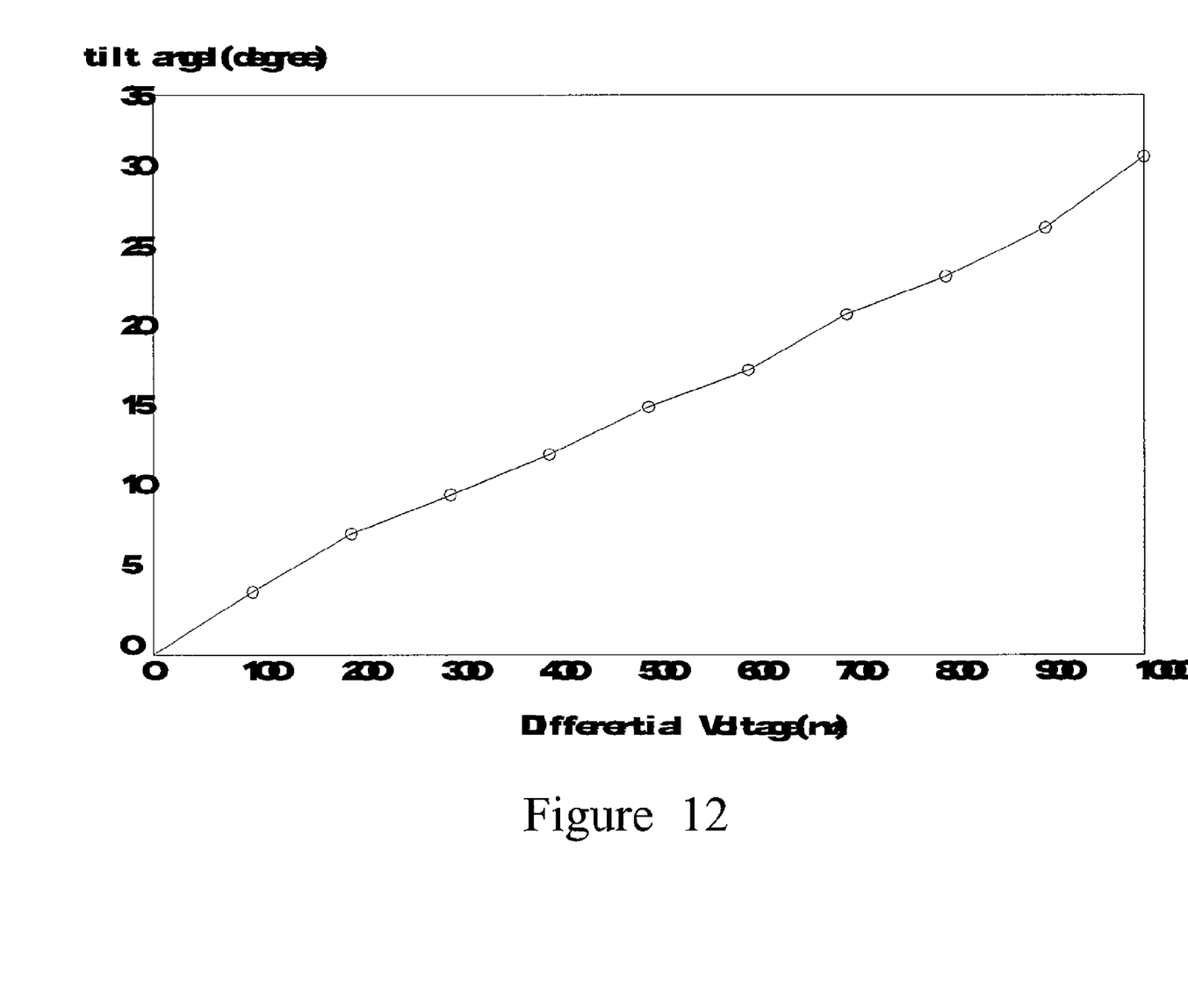
FIG. 12 is a graph of the relationship between the differential voltage and the angle of inclination of the tilt detector in FIG. 9.

Refer to FIG. 9, FIG. 10, FIG. 11 and FIG. 12. FIG. 9 is a perspective view of a tilt detector of another embodiment of the present invention. FIG. 10, FIG. 11 and FIG. 12 shows a third embodiment of the present invention. FIG. 9 shows a tilt detector is similar to the tilt detector of FIG. 7, except the window 22 of the position sensitive detector 20 is formed on a plane extended from a first axis X and a second axis Y crossed with the first axis. The window 22 detects the two-dimensional coordinates of the facula on the plane.

In the third embodiment, the signal port device 23 of the position sensitive detector 20 further comprises a fourth signal terminal 234 and a fifth signal terminal 235. The second signal terminal 232 and the third signal terminal 233 are used to output the different currents corresponding to the various facula location moving along the first axis X. The fourth signal terminal 234 and the fifth signal terminal 235 output the different currents corresponding to the various facula locations moving along the second axis Y.

In addition, the control module 42 of the control unit 40 further comprises four current-to-voltage converter circuits 421 and four amplifier circuits 422. Furthermore, the tilt detector of the third embodiment includes another outputting device 44, a liquid crystal display (LCD).

According to the second embodiment, the position sensitive detector 20 outputs two different electric currents when the tilt detector 200 is set on a inclined subject, and the current-to-voltage converter circuit 421 outputs two voltages corresponding to the electric currents. In the third embodiment of the present invention, the control unit 423 calculates the differential voltage of varied tilt angles. The relationship between the varied tilt angles and the differential voltage are showed in FIG. 12. If the tilt detector is set on an inclined subject, the LED cannot be lighted and the degree of the tilt angle can be displayed in the LCD to provide the tilt state to the user.

In summary, the tilt detecting method of the embodiments of present invention employ the tilt detector 200 to perform following operation:

(A) laying the tilt detector 200 on a subject;

(B) forming a facula on the window 22 from a beam transmitted through the light-permeable substance 33;

(C) determining the facula location output through the signal port device 23 of the position sensitive detector 20, and comparing each electric current outputted from the position sensitive detector 20. If all electric currents outputted from the position sensitive detector 20 are equal, the facula is located in the center of window 22 and the position sensitive detector 20 is level; (D) radiating a signal light from the LED device when the tilt detector 200 is set on a level subject; and (E) displaying a degree of inclination from the LCD device when the tilt detector 200 is set on an inclined subject.

The tilt detecting method employs the light-permeable substance 33 to observe the level state of a subject directly. According to the above-mentioned, the manner is similar to the conventional spirit level. Moreover, the signal port device 23 of the position sensitive detector 20 determines more precisely the level state by receiving the signal of the locational variation of the facula, so as to level the subject by adjusting the light-permeable substance 33 to the center of the window 22. The tilt detector provides great precision for determining and observing the level state with the naked eye. Furthermore, the tilt detector is economical to use because of the manufacturing of the position sensitive detector 20 and light-permeable unit 30 are maturity-developed techniques. It should be noted that the position sensitive detector 20 is not only a light-detecting unit, but also a photoelectric converter unit.

Although the present invention has been described in considerable detail with reference to certain embodiments thereof, other embodiments are possible. For example, an image extraction unit, such as a complementary metal-oxide-semiconductor (CMOS) or a charge coupled device (CCD), is being substituted for the position sensitive detector 20 and used to detect the facula position. By using the image extraction unit, the coordinates of a pixel with highest brightness values are obtained and the tilt state of a subject in accordance with the coordinates is calculated. All light-permeable substances with density unequal to the opaque fluid may be used as the light-permeable substance 33, such as a gas undissolvable in the opaque fluid, a bubble, or a bead (for example, glass ball).

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A tilt detecting method, comprising:
(A) setting a tilt detector on a subject, and the tilt detector comprises a light-detecting unit and a light-permeable unit, wherein
the light-detecting unit comprises a body, and a window formed on the body;
the light-permeable unit comprises a chamber, an opaque fluid filling the chamber, and a light-permeable substance positioned in the opaque fluid, wherein the chamber comprises a first sidewall connected with the window and pervious to light, a second sidewall opposite to the first sidewall and pervious to light; the light-permeable substance touches the first sidewall and the second sidewall in the chamber and moves along a slope of an subject;
(B) detecting a facula location with the light-detecting unit comprising a window, wherein when a beam is emitted to the window via the light-permeable substance, outputting at least one signal corresponding to the facula location, and the facula location in the window is shifted according to the movement of the light-permeable substance; and
(C) determining a tilt state of the subject in accordance with the result of calculation of the at least one signal.

2. The method of claim 1, wherein the at least one signal mentioned in the step (B) is a current signal.

3. The method of claim 2, wherein the step (C) comprises comparing all of the outputted current signals to determine the facula location.

4. The method of claim 3, wherein the light-detecting unit is a position sensitive detector (PSD).

5. The tilt detector of claim 1, wherein the light-detecting unit outputs a corresponding signal, comprises:
determining a pixel with a highest brightness value of the light-detecting unit, and
providing a coordinate of the pixel to the control unit.

6. The method of claim 1, wherein the step (B) comprises:
determining a pixel with highest brightness value of the light-detecting unit; and
outputting the coordinates of the pixel.

7. The method of claim 6, wherein the step (C) calculates the tilt degree of the subject with the coordinates of the pixel.

8. The method of claim 6, wherein the light-detecting unit is a complementary metal-oxide-semiconductor (CMOS) or a charge coupled device (CCD).

9. The method of claim 1, wherein a density of the light-permeable substance is unequal to the density of the opaque fluid.

10. A tilt detector, and the tilt detector comprising:
- a chamber comprising a first sidewall and a second sidewall, wherein the first sidewall and the second sidewall are light permeable, parallel and opposite to each other;
- an opaque fluid filling the chamber;
- a light-permeable substance movably set in the chamber and touching the first sidewall and the second sidewall;
- a light-detecting unit mounted outside the chamber, and comprising a window corresponding to the first sidewall whereby a beam is emitted to the light-detecting unit through the second sidewall, the light-permeable substance and the first sidewall to form a facula in the window, wherein the facula is shifted according to the movement of the light-permeable substance; and
- a control unit.

11. The tilt detector of claim 10, wherein the control unit comprises a substrate, a control module set on the substrate and electrically connected with a signal port device, a control switch set on the substrate and electrically connected with the control module, and an outputting device set on the substrate and electrically connected with the control module.

12. The tilt detector of claim 11, wherein the control module comprises a plurality of current-to-voltage converter circuits electrically connected with the signal port device, a plurality of amplifier circuits respectively electrically connected with the current-to-voltage converter circuits, a control device electrically connected with the amplifier circuits, and a battery-powered power circuit, wherein the control device provides an analog-to-digital function.

13. The tilt detector of claim 12, wherein the outputting device is a light-emitting diode or a liquid crystal display device.

14. The tilt detector of claim 11, wherein the signal port device comprises a plurality of signal terminals.

15. The tilt detector of claim 14, wherein at least two of the signal terminals output different currents in accordance with the facula location variation along the first axis.

16. The tilt detector of claim 15, further comprising a photoelectric converter unit.

17. The tilt detector of claim 16, wherein the photoelectric converter unit is a position sensitive detector.

18. The tilt detector of claim 10, wherein the light-detecting unit detects a facula location generated from the incident beam, and outputs a signal corresponding to the facula location to the control unit.

19. The tilt detector of claim 10, wherein the light-detecting unit is a complementary metal-oxide-semiconductor (CMOS) or a charge coupled device (CCD).

20. The tilt detector of claim 10, wherein a density of the light-permeable substance is unequal to the density of the opaque fluid.

* * * * *